United States Patent [19]

Brunsting

[11] 4,327,972
[45] May 4, 1982

[54] REDIRECTING SURFACE FOR DESIRED INTENSITY PROFILE

[75] Inventor: Albert Brunsting, Miramar, Fla.

[73] Assignee: Coulter Electronics, Inc., Hialeah, Fla.

[21] Appl. No.: 87,110

[22] Filed: Oct. 22, 1979

[51] Int. Cl.³ .......................... G02B 3/10; G02B 5/10
[52] U.S. Cl. .................................... 350/437; 350/296
[58] Field of Search .............. 350/409, 437, 440, 292, 350/296

[56] References Cited

U.S. PATENT DOCUMENTS

| 2,080,352 | 5/1937 | Weisse | 350/437 X |
| 3,476,463 | 11/1969 | Kreuzer | 350/453 X |
| 3,588,227 | 6/1971 | Tamamoto | 350/437 |
| 4,128,308 | 12/1978 | McNaney | 350/286 |
| 4,155,626 | 5/1979 | Grech | 350/437 X |

FOREIGN PATENT DOCUMENTS

| 927311 | 1/1956 | Fed. Rep. of Germany | 350/437 |
| 1144182 | 3/1969 | United Kingdom . |
| 1238335 | 7/1971 | United Kingdom . |
| 1272051 | 4/1972 | United Kingdom . |
| 1339846 | 12/1973 | United Kingdom . |
| 1459936 | 12/1976 | United Kingdom . |
| 1465526 | 2/1977 | United Kingdom . |
| 1482572 | 8/1977 | United Kingdom . |
| 1509937 | 5/1978 | United Kingdom . |
| 2017964 | 10/1979 | United Kingdom . |
| 2020060 | 11/1979 | United Kingdom . |
| 1574178 | 9/1980 | United Kingdom . |
| 2044948 | 10/1980 | United Kingdom . |
| 1581551 | 12/1980 | United Kingdom . |

OTHER PUBLICATIONS

Fluorescence Techniques in Cell Biology, A. A. Thaer and M. Sernetz; Springer-Verlag; 1973; p. 80.
Spawr Optical Research, Inc.; Data Sheet, No. 512; Jan., 1978.

*Primary Examiner*—John K. Corbin
*Assistant Examiner*—Scott J. Sugarman
*Attorney, Agent, or Firm*—William A. Newton

[57] ABSTRACT

An improved illuminating system for redistributing incident radiation, having a non-uniform intensity distribution, to resultant radiation, having a narrower desired intensity distribution in a predetermined region of an output plane, the illuminating system comprising a redirecting surface of a lens or reflector, for relocating at least a portion of the incident light. In one application, particles are illuminated in the output plane.

13 Claims, 20 Drawing Figures

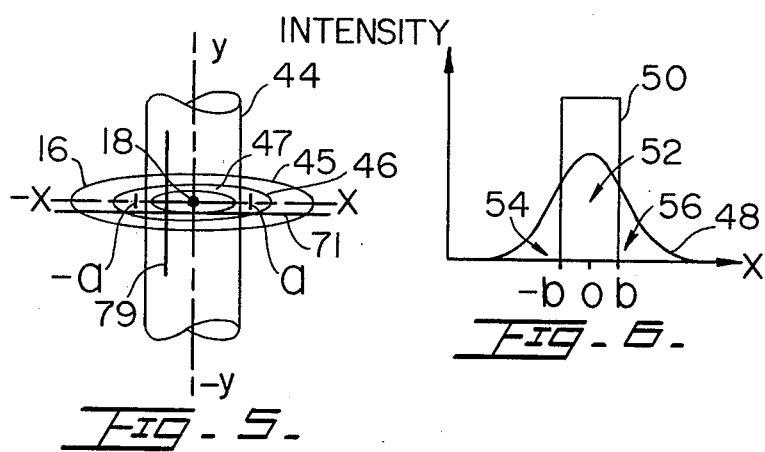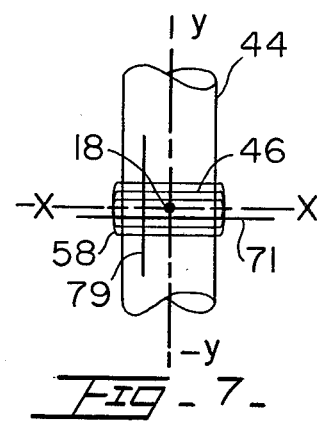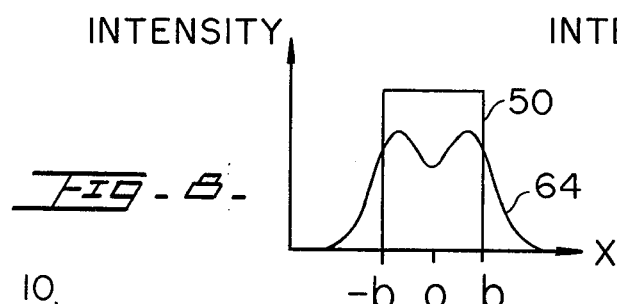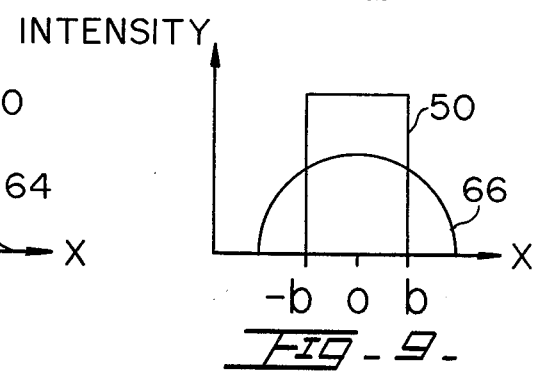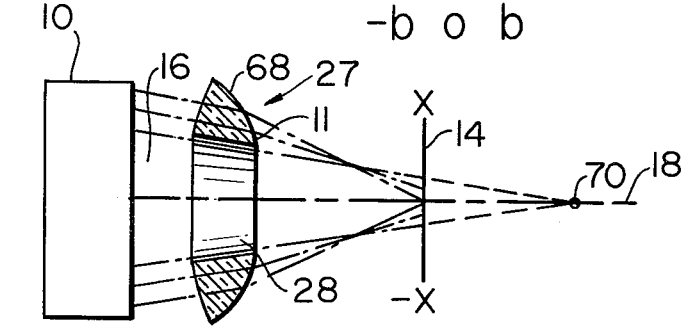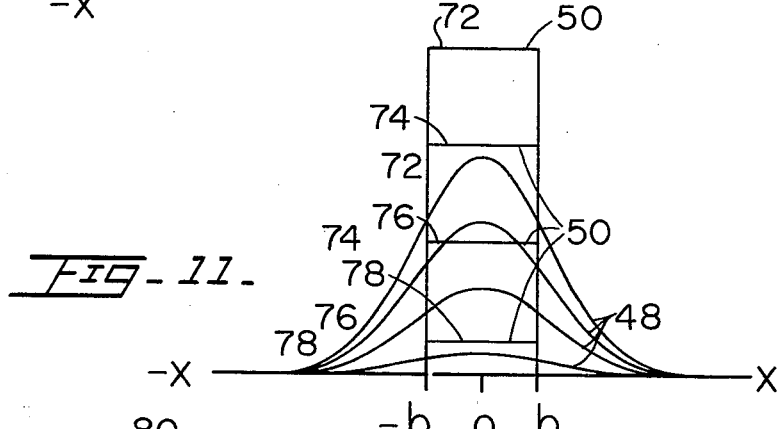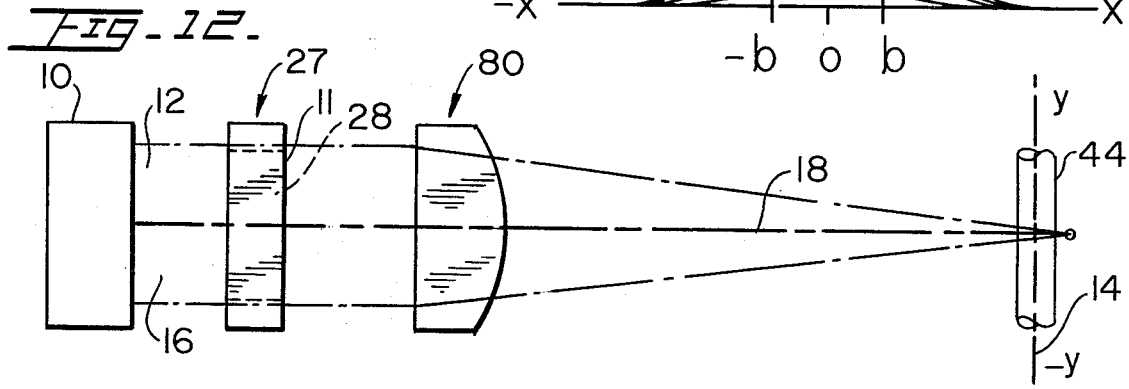

REDIRECTING SURFACE FOR DESIRED INTENSITY PROFILE

BACKGROUND OF THE INVENTION

1. Field of the Invention

The present invention relates to the redistribution of an incident density profile of light to yield a new desired intensity profile and, in one application, the concentration of the light into a new desired intensity profile for irradiating particles.

2. Description of the Prior Art

Many prior art flow cytometers utilize a laser beam for irradiating particles, suspended in a fluid flow, to produce detectably optical signals. These flow cytometers waste much of the high cost, high grade incident light. Typically, beam shaping optics focus collimated light from the laser into a slit-like ellipse at the location where the particles are illuminated. In that it is necessary to irradiate the particles with a relatively uniform high intensity light across the range of possible particle trajectories, only a relatively small center portion of this incident light usually is used, as shown in FIG. 5, by the range of $(-a \leq x \leq +a)$, wherein a equals the limiting x coordinate value for a particle trajectory. The unused energy (i.e., wasted) in the wings of this slit can be 84% of the total energy for a 2% variation in intensity across the possible particle trajectories, assuming a Gaussian intensity profile along the x direction of FIG. 5. If a smaller amount of variation in intensity is required (e.g., 1%), a higher percentage of incident energy is not used.

Accordingly, it can readily be seen that there is a need in the art of cytology for a cytometer that utilizes more of the available radiant energy, while at the same time, maintains negligible or low intensity variations across the possible particle trajectories. For more generalized usage, there is a need in the optical arts for transforming organized incident radiation into radiation having a desired intensity profile.

Relevant prior art is disclosed in U.S. Pat. No. 3,476,463 to Kreuzer; U.S. Pat. No. 4,128,308 to McNaney; Data Sheet No. 512, January, 1978, of Spawr Optical Research, Inc.; and *Fluorescence Techniques in Cell Biology*, A. A. Thaer and M. Sernetz, Springer-Verlag, 1973, p. 80.

SUMMARY OF THE INVENTION

The present invention is directed toward an optical device and a method for redistributing incident, organized radiation, having a non-uniform intensity distribution; to resultant radiation, having a desired intensity distribution. The optical device includes a redirecting surface, in the form of a reflecting mirror or refracting lens surface, which redirects specific rays of the incident radiation to specific locations on an output plane for irradiation of the output plane. The amount of optical modification of the incident radiation by the redirecting surface is a function of the direction, dimensions, energy, and location of the incident radiation profile and the desired resultant radiation profile. In some embodiments of the present invention, rays strike a peripheral portion of the redirecting surface and are pointed toward specific points of the output plane. These same points are also irradiated by specific rays which strike or pass through a central portion of the redirecting surface. The overlapping of radiation from the peripheral portion and the central portion concentrates the incident radiation to produce the resultant radiation, having the desired intensity distribution at the output plane. In other embodiments, most or all of the rays which strike the redirecting surface are optically modified to concentrate them, without overlapping, into the resultant radiation, having the desired intensity distribution at the output plane.

The above described invention has a particularly novel application in prior art particle analyzers wherein particles are illuminated to produce detectable optical signals. The prior art particle analyzers waste much of the high cost, high grade incident light, such light having a non-uniform intensity distribution. The optical system of the present invention redistributes the incident light to provide a substantially uniform, high intensity light distribution at the output plane, which contains the particles to be illuminated. The optical device of the present invention eliminates the wasting of most of the energy, while at the same time, maintains low intensity variations across possible particle trajectories. The optical device of the present invention may be readily adapted for other useful purposes.

BRIEF DESCRIPTION OF THE DRAWINGS

Further objects and advantages of the present invention will become apparent as the following description proceeds, taken in conjunction with the accompanying drawings in which:

FIG. 5 is a cross-sectional view of an elliptical radiation profile for illuminating a stream;

FIG. 6 shows an incident intensity distribution with a corresponding resultant distribution;

FIG. 7 is a cross-sectional view of the radiation profile after the incident radiation has been redistributed by the present invention for illuminating a stream;

FIG. 8 shows an incident intensity distribution with a corresponding resultant distribution;

FIG. 9 shows yet another incident intensity distribution with a corresponding resultant distribution;

FIG. 10 is a view of a variation to the embodiment illustrated in FIG. 2;

FIG. 11 shows a plurality of sets of corresponding incident and resultant intensity distributions;

FIG. 12 is a side plan view which illustrates a specific application for the embodiment illustrated in FIG. 2;

DESCRIPTION OF THE PREFERRED EMBODIMENTS

Figure 1:
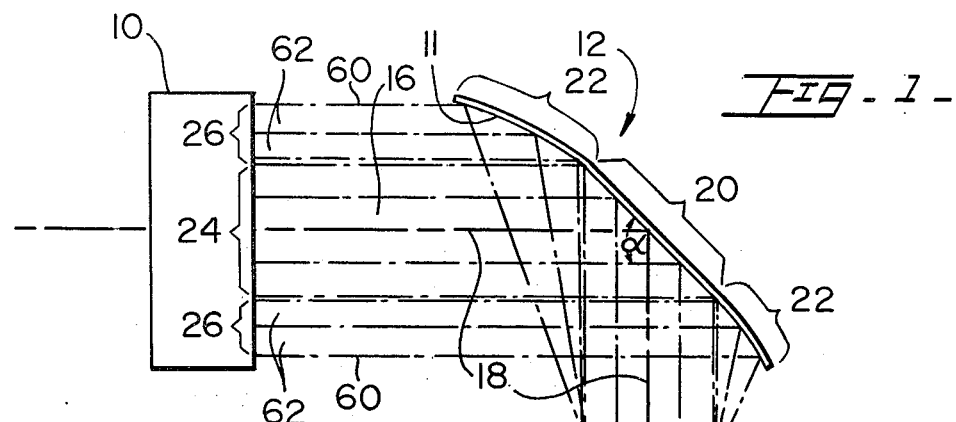
FIG. 1 is a view of the radiation redistribution in one plane of a reflector embodiment of the present invention.

An optical system of the present invention in the embodiment of FIG. 1 has a light source 10 which produces an incident beam of light, usually having a non-uniform intensity distribution. A redirecting surface, in the form of a reflector 12, redistributes the light represented by this incident non-uniform intensity distribution so as to generate output light having a desired predetermined distribution at an output plane 14. The light source 10 can be, for example, a gas type laser, having associated beam shaping optical elements, which emits a continuous or intermittant beam 16 of light. Also, the light source 10 can be a high pressure mercury arc lamp, having conventional beam shaping optical elements. The reflector 12 is shown in cross section and centered on an optical axis 18. The reflector 12 has a central reflector portion 20 and an integrally adjacent concave peripheral reflector portion 22. The central reflector portion 20 is positioned at an angle, $\alpha$, with respect to the optical axis 18. By virtue of this geometry, a center region 24 of light, substantially centered on the optical axis 18, reflects from the central reflector portion 20 and proceeds from the same. Hence, the center region 24 of light has its direction changed by $2\alpha$. The peripheral reflector portion 22 is concave with respect to incident light for the purpose of redistributing the incident light in a peripheral region 26 of light with respect to the light in the center region 24. The peripheral reflector portion 22 is adjusted with respect to the output plane 14 so that the peripheral region 26 of light is superimposed over the center region 24 of light at the output plane 14. More specifically, the reflector 12 accomplishes a spatial redistribution of the peripheral region 26 of light onto the same area as the center region 24 of light. In this manner, the redirection of peripheral light rays results in the formation of the desired intensity profile, such as a uniform profile, in the output plane 14.

Figure 2:
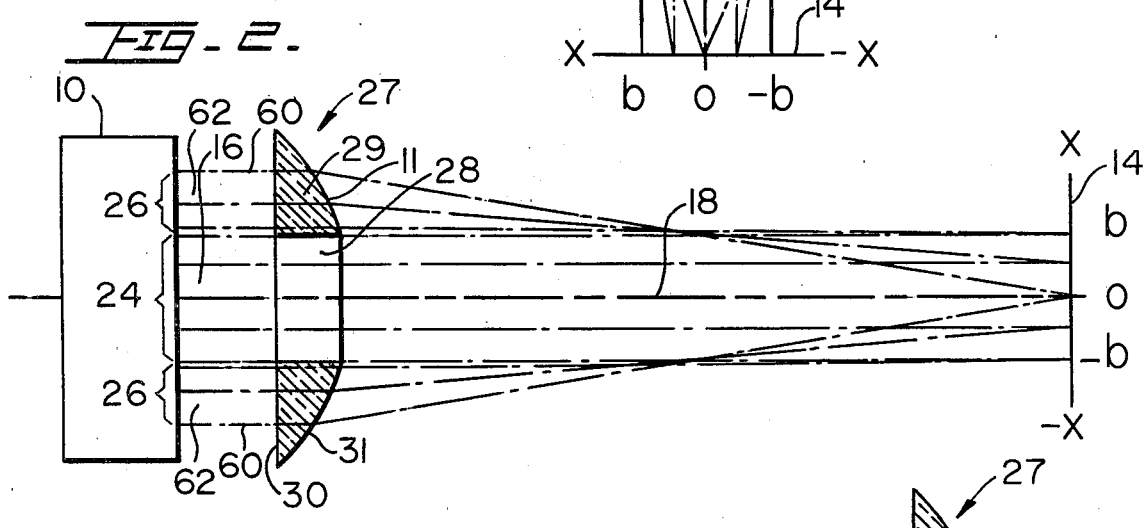
FIG. 2 is a view of the radiation redistribution in one plane of a lens embodiment of the present invention.
Figure 3:
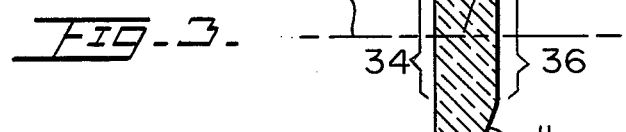
FIG. 3 is a view of a variation of the embodiment illustrated in FIG. 2.

Another embodiment of the optical system of the present invention is illustrated in FIG. 2. In this embodiment, the redirection surface 11 for light relocation comprises a lens 27 which produces the same results at the output plane 14 as the reflector 12 of FIG. 1. The lens 27 has an aperture 28 formed therein, and the lens 27 and its aperture 28 are concentrically positioned on the optical axis 18. The aperture 28 is dimensioned and configured to have the center region 24 of light pass therethrough, whereby the direction of such light is not substantially modified optically. A solid peripheral lens portion 29 of the lens 27 is configured and dimensioned to receive the peripheral region 26 of light and refracts such light to overlap with the center region 24 of light to create the desired distribution in the output plane 14. The lens 27 has a planar outer surface 30, which is perpendicular to the optical axis 18 and does not substantially refract the light, and a curved outer surface 31, which refracts light in a manner to be described hereinafter. It should also be appreciated that, although the surface 30 is shown to be planar, the surface 30 could also be curved. Consequently, the surface 30, in combination with the surface 31, would give the desired refraction. A minor variation to the embodiment of FIG. 2 is illustrated in FIG. 3. The lens 27, instead of having the aperture 28, is provided with central lens portion 32 having a pair of planar, parallel boundaries 34 and 36. The central lens portion 32 provides the same function as the aperture 28, in that light passing therethrough is not substantially modified optically.

Figure 4:
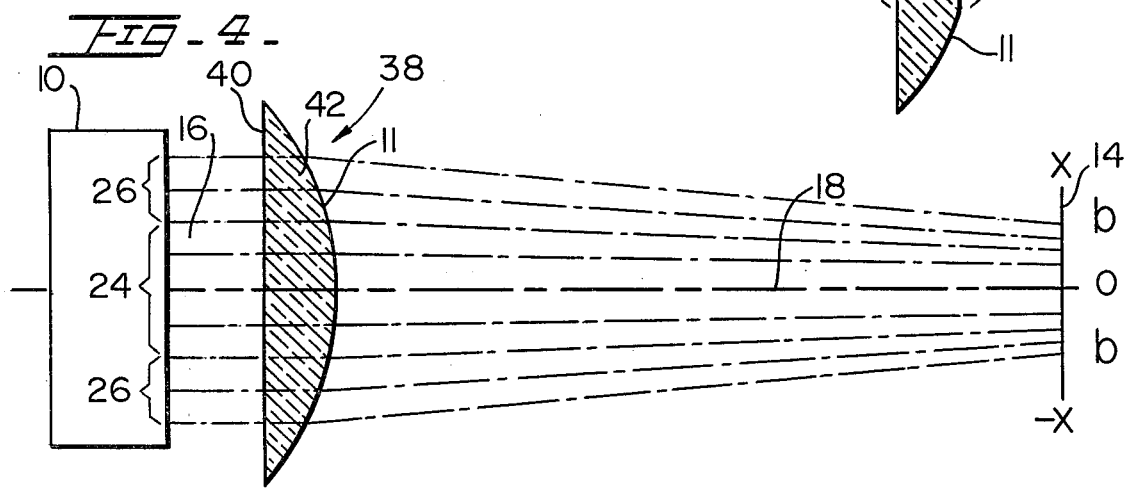
FIG. 4 is a view of the radiation redistribution in one plane of another lens embodiment of the present invention.

Yet another embodiment of the optical system of the present invention is illustrated in FIG. 4. The redirecting surface 11 of this embodiment comprises a lens 38 shown in cross section and centered on the optical axis 18. The lens 38 has a planar outer surface 40, which is perpendicular to the optical axis 18, and a curved outer surface 42 for redistributing the incident light from the light source 10 into a desired intensity profile at the output plane 14. In the illustrative embodiment of FIG. 4, the rays are progressively refracted inward by the lens 38, with increasing amounts of light refraction proceeding from the center outward to the periphery of the lens 38.

Frequently in practice it is found that the light intensity across a laser beam is closely approximated by a Gaussian or normal distribution which may be mathematically described by the equation:

$$I(r) = \exp[-(r/a)^2], \quad (1)$$

where $I(r)$ is the intensity at a distance $r$(units of meters) from the optical axis 18 with units of watts/meter$^2$ and "a" is a scale factor (units of meters). Moreover, in the art of flow cytology, wherein particles in a flow stream are illuminated by a Gaussian laser beam, it is particularly advantageous to have uniform intensity illumination at an output plane which passes through the flow stream with a minimum of wasted light and a maximum intensity. For example, referring to FIG. 5, the beam 16 of light, which is perpendicular to the plane of the drawing, has a Gaussian distribution and is superimposed over a typical flow stream 44, such as illustrated in the article entitled "Quantitative Single Cell Analysis and Sorting", published in "Science" magazine, Volume 198, No. 4313. Typically, in a conventional flow stream arrangement, such as the flow stream 44, cells enter a flow chamber under pressure through an introduction tube which is surrounded by a sheath fluid. Well known laminar sheath-flow techniques allow for the cells to be confined to the center of the flow stream close to and along the y-axis. The flow stream 44 is normally a liquid jet with the particles suspended therein and surrounded by a quiescent liquid or gas. Also, the flow stream 44 could be a gas jet with another gas surrounding it. Generally, the incident beam has a slit-like elliptical cross-sectional profile 45. The magnitude of the light intensity is illustrated by a plurality of intensity contour lines 46, such lines 46 illustrating the progressively increasing intensity of the beam 16 with respect to movement toward the optical axis 18. Since the illustrated size relationships of the flow stream 44 and the beam 16 are those that commonly exist at the intersection of the two in the prior art cytometers, it is evident that a large amount of the light does not enter the flow stream 44 and therefore is wasted. Thus, according to the prior art, the intensity of light through which the particles flow is less than the intensity provided by the present invention. Some overlapping of beam 16 with respect to the flow stream 44 is necessary so as to allow for lateral movement of the flow stream 44. However, most of the overlapping is a function of the need to have uniform illumination of the flow stream 44. Hence, the prior art cytometric devices have only been able to use a small center area 47 of the beam 16. Accordingly, the invention will be described hereinafter in connection with a specific embodiment in which an incident Gaussian distribution is used to illuminate the flow stream 44 of a conventional cytometer.

FIG. 6 shows the incident distribution 48 of the light intensity as emitted from the light source 10 which, for the purposes of illustration, is a Gaussian distribution of a laser in a $TEM_{OO}$ mode. Here the intensity I(r) of the emitted light is considered to be a function of a distance "r" from an optical axis 18. Assuming that the Gaussian distribution 48, for example, is the incident intensity distribution of beam 16 in the embodiments of FIGS. 1, 2 and 4, then the desired resultant intensity distribution is illustrated by a uniform intensity distribution. When the present invention is applied to particle analysis, such a uniform distribution 50 is desirable for providing more uniform illumination of particles contained in the flow stream 44. The two distributions 48 and 50 are superimposed over each other in FIG. 6 so as to show how the light is redistributed by the redirecting surface 11 of FIGS. 1, 2, and 4. The middle area 52 of the distributions 48 and 50, which extends from "b" to "−b" along the x axis coincides with the incident width of the center region 24 of light. A pair of opposed areas 54 and 56 of the distributions outside the range of "−b" to "b" coincide with the incident light in the peripheral region 26. In the incident distribution 48, the power (units of watts) in the opposed areas 54 and 56, $P_1$, and the middle area $P_2$, are related to the total power $P_T$, by:

$$P_1 + P_2 = P_T \tag{2}$$

$P_2$ is chosen so that a constant, or desired, intensity distribution is obtained. $P_1$ does not necessarily have to be equal to $P_2$. After reflection from the reflector 12 or refraction of the lens 27 or 38, a uniform intensity distribution 50 is generated in which the peripheral region 26 of light, outside of the "−b" to "b" range, has been shifted to the center region 24 of light. With the uniform intensity distribution 50, the power of the middle area 52, $P_2$, and the opposed areas 54 and 56, $P_1$ are as follows:

$$P_2 = P_T \text{ AND } P_1 = 0 \tag{3}$$

Hence substantial light wastage in the opposed areas 54 and 56 is eliminated, a substantially uniform illumination of the flow stream 44 is maintained, and the intensity in the middle area 52 is increased. As a result, a less powerful laser is required to accomplish the same results achievable without the redirecting surface 11 of the present invention. Hence, instead of the elongated light profile 45, as shown in FIG. 5, a generally rectangular profile 58, as shown in FIG. 7, is obtained, for example.

Using the lens 27 of FIG. 2 or the reflector 12, the Gaussian distribution 48 can be converted to the uniform distribution 50, as shown in FIG. 6, by a progressive fold-over relocation of the peripheral region 26 of light such that the most remote edge 60 of the Gaussian distribution 48 is redistributed near the optical axis 18 and therefore near the peak of the Gaussian distribution. Each successively small segment 62 of the peripheral region 26 of light, which is disposed inward from the edge 60 is relocated progressively further out from the optical axis 18. Although the light segments 62 do not have to be shifted in a strict progression of innermost to outermost, other arrangements of shifting segments, for these particular distributions 48 and 50, causes substantially greater lens discontinuities. The number of segments required for overlapping the peripheral region 26 of light over the center region 24 of light is a matter of design perference.

Using the lens 38 of FIG. 4, the Gaussian distribution 48 can be converted to the uniform distribution 50, as illustrated in FIG. 6, by progressively increasing the amount of refraction of the lens 38 from the optical axis 18, outward to the periphery of the lens 38.

Referring to FIG. 8, a two peak intensity distribution 64 is shown which is illustrative of a light source 10 comprising a laser in the $TEM_{01}$ mode. With this distribution 64 as the incident distribution, the skirts of the same would be relocated by the redirecting surface 11 of the present invention to fill in the valley, so as to create the desired intensity distribution, such as in the uniform intensity distribution 50.

Referring to FIG. 9, an intensity distribution 66 for a typical incoherent light source 10, such as a high pressure mercury arc lamp, is illustrated. The various embodiments of the present invention, shown in FIGS. 1, 2, and 4, can be used to relocate the end portions of the distribution 66 into a desired distribution, such as the uniform intensity distribution 50.

In FIGS. 6, 8, and 9, the desired, resultant intensity distribution has been selected to be the uniform intensity distribution 50. As previously described, the uniform intensity distribution 50 in the output plane 14 is particularly useful in the art of cytology for irradiating particles. However, it should be appreciated that the embodiments of this invention, as illustrated in FIGS. 1, 2, and 4, may be adapted to create desired intensity distributions, other than the uniform intensity distribution 50. Also, it should be appreciated that central reflector portion 20 and the central lens portion 32 can be modified in dimensional size and configuration to accomplish the desired intensity distribution.

In the embodiments of FIGS. 1, 2, and 4, the light source 10 provides the light beam 16 which, for the purposes of illustration, is collimated. However, it should be understood that any organized radiation, whether collimated, divergent or convergent, may comprise the incident radiation for use with the present invention. Merely for the purposes of illustration, one of many variations of the light beam 16 that is within the scope of this invention, is illustrated in FIG. 10. FIG. 10 illustrates the use of a redirecting surface 11 for a convergent beam 16. The lens 27 relocates light in a manner already explained. Likewise the output plane 14 is positioned between the lens 27 and a focus 70, but could be positioned on the other side of the focus 70. There are many variations of incident light organization, with the corresponding modification to the redirecting surface 11, that will be obvious to those skilled in the art.

In FIGS. 1, 2, and 4, the optical systems have been viewed from a single cross-sectional plane 71, which is perpendicular to the plane of the drawings in FIGS. 5 and 7 and parallel to the x-axis. Referring to FIG. 5, it should be appreciated that there are an infinite number of these planes 71 which perpendicularly intersect at the y-axis and have the Gaussian distribution 48. In one application of the redirecting surface 11 of the present invention, each of these planes 71 is modified in a manner illustrated in FIGS. 1, 2, and 4. In FIG. 7, for example, the planes 71 more remotely disposed from the optical axis 18 intersect the elliptical profile 45 so as to have less power than those planes nearer the optical axis 18. Assuming that the range "−b" to "b" is maintained, for example, with the uniform intensity distribution 50, then the intensity I of the distribution 50 of a given plane 71 would be less relative to the intensity values of distributions 50 for planes 71 positioned nearer the optical axis 18. As shown in FIG. 11, a plurality of sets of corresponding Gaussian and uniform intensity distributions 48 and 50, respectively, are identified as 72, 74, 76 and 78. Hence, in FIG. 7, as the particle trajectory deviates with respect to the x-axis, a given particle would be presented with a substantially uniform illumination, not considering refraction caused by the stream 44. On the other hand, as particles traverse the beam profile 58 along the y-axis, there would be some variation in the intensity of the illumination. It should be understood that the range "−b" to "b" must be selected so that in any given set 72 or other set, the peak intensity of the Gaussian distribution 48 must not exceed the desired intensity of the uniform distribution 50. Otherwise, it would be necessary to shift light from the center region 24 of light. As will be seen in the three dimensional illustrations of the embodiments described hereinafter, the range "−b" to "b" can remain constant or can vary, depending upon the configuration of the center region 24. As will become apparent, the three dimensional resultant distribution is typically modified to be uniform with respect to only one axis. However, if the range "−b" to "b" is varied in a predetermined manner, or if light redistribution is undertaken with respect to both axes, then the three dimensional resultant distribution can be made uniform with respect to both the x-axis and the y-axis, as will be described in more detail hereinafter. Varying the range "−b" to "b" is generally not desirable in that it requires nonlinear surfaces. Referring to FIGS. 5 and 7, although planes 79, which are perpendicular to the drawing and parallel to the y-axis, also contain Gaussian distributions, for the application of particle analysis, the variation in illumination of the elliptical profile 45 with respect to the y-axis is so small, the incident light does not need to be modified with respect to the y-axis.

Figure 13:
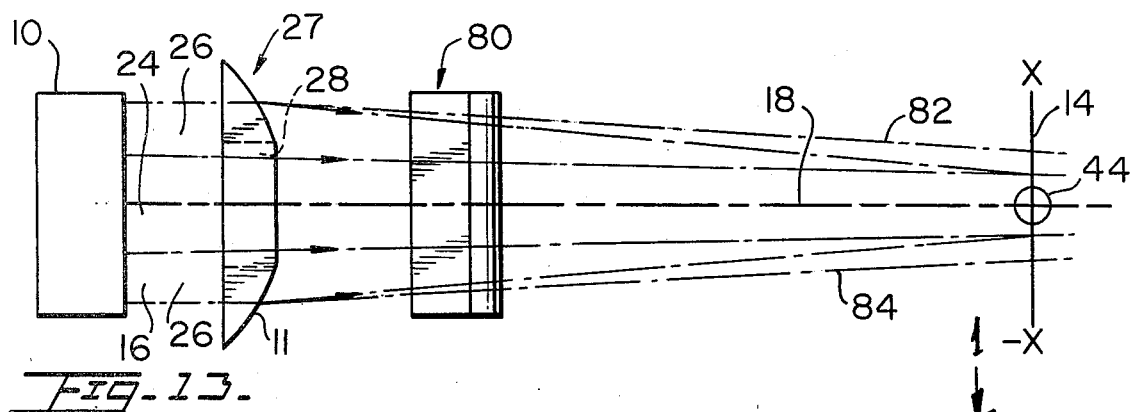
FIG. 13 is a top plan view of the arrangement shown in FIG. 12.
Figures 14, 15:
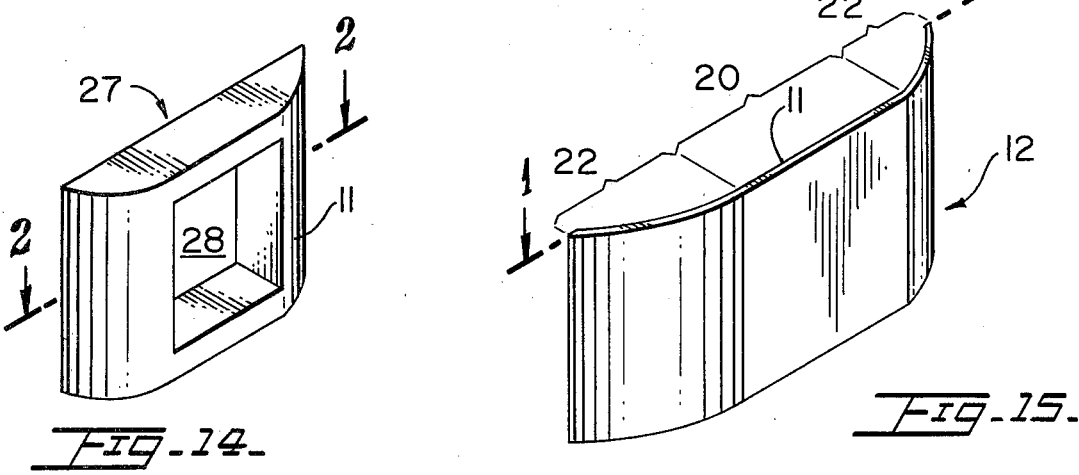
FIG. 14 is a perspective view of a lens embodiment incorporating the radiation redistribution of the lens of FIG. 2.
FIG. 15 is a perspective view of a reflector embodiment which incorporates the radiation redistribution of the reflector of FIG. 1.
Figures 16, 17:
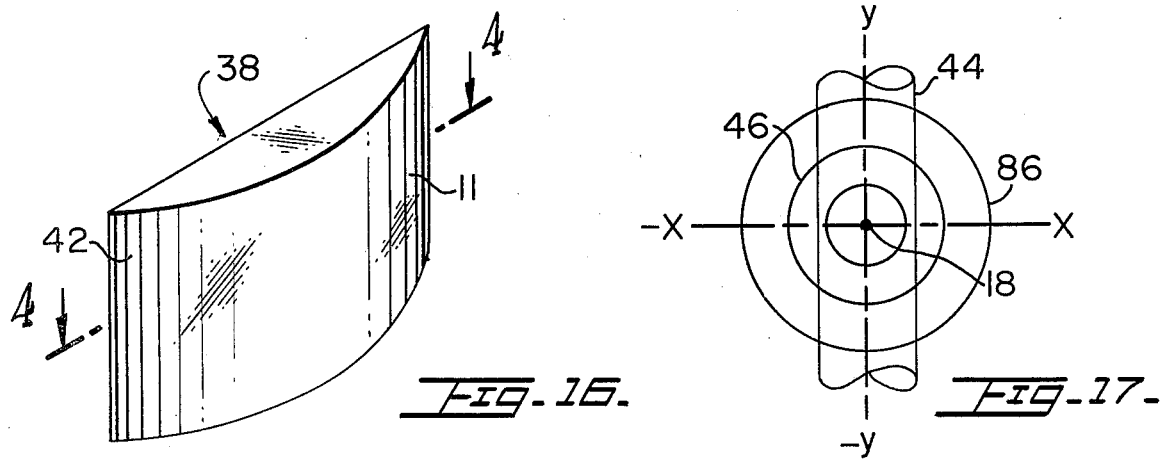
FIG. 16 is a perspective view of a lens embodiment which incorporates the radiation redistribution of the lens of FIG. 4.
FIG. 17 is a cross-sectional view of a circular radiation profile for irradiating a stream.

FIGS. 12 and 13 are specifically directed toward applying the lens 27 to the application of particle analysis in a conventional cytometer, wherein the prior art cytometer illuminated the particles contained within the stream 44 with radiation having the slit-like elliptical profile 45, as illustrated in FIG. 5. Typically, the prior art uses a cylindrical lens 80 to line focus the beam 16 with respect to the y-axis. Referring to FIG. 13, a second cylindrical lens (not shown) usually is positioned in prior art arrangements where the lens 27 is positioned, and is used to slightly converge the light with respect to the x-axis, such converging being illustrated by the outer boundary lines 82 and 84 of a typical beam in the prior art. In the embodiment illustrated in FIGS. 12 and 13, the lens 27, which comprises a modified cylindrical lens, is substituted for the second cylindrical lens. It should be appreciated that the light beam 16 from the light source 10 has a substantially circular cross section prior to impinging upon the lens 27. In the embodiment of FIGS. 12 and 13, the lens 80 is interposed between the output plane 14 and the lens 27. It should be understood that the positioning of other optical surfaces between the redirecting surface 11 and the output plane 14 is within the scope of the present invention. Interposing such optical surfaces, such as the lens 80, results in a correspondingly modifying the redirecting surface 11, so that the combination of the redirecting surface 11 and the interposed optical surface provides the desired intensity profile at the output plane 14. FIG. 15 illustrates a perspective view of the reflector 12 which is equivalent to the lens 27 of FIG. 14. FIG. 16 illustrates the lens 38 in a perspective view, which can be used in the above described application. Each of the redirecting surfaces 11 in FIGS. 14, 15, and 16 optically modify the incident light in planes 71 with respect to the x-axis. Such modification for the lens 27 of FIG. 14 is illustrated in FIG. 2, for the reflector 12, in FIG. 1, and for the lens 38, is illustrated in FIG. 4.

Figures 18, 19, 20:
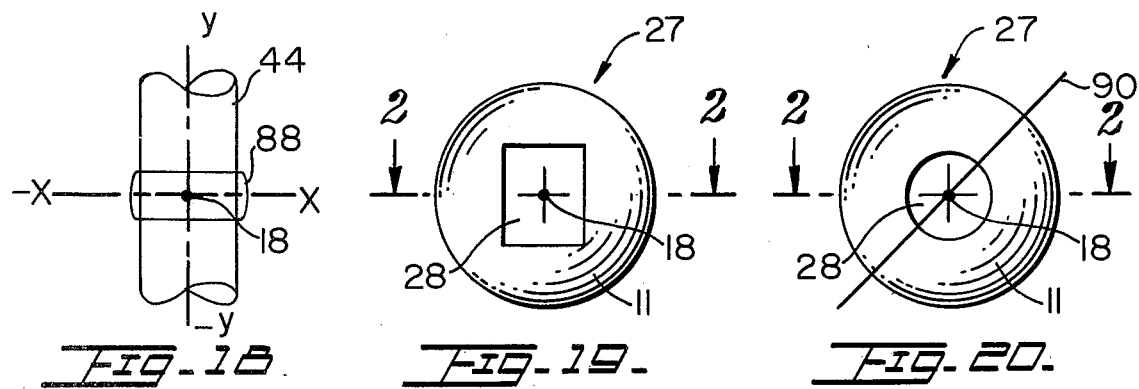
FIG. 18 is a cross-sectional view of a square radiation profile for irradiating a stream.
FIG. 19 is a plan view of a lens embodiment which incorporates the radiation redistribution of the lens of FIG. 2.
FIG. 20 is a plan view of a lens embodiment incorporating the radiation redistribution of the lens of FIG. 2.

Referring to FIG. 17, there is illustrated the beam 16 with a substantially circular cross-sectional profile 86. With the elliptical profile 45 of FIG. 5, typically created by two cylindrical lens in a manner previously described, there was no need for making the light more concentrated with respect to the y-axis. However, this is not the case with FIG. 17, which is illustrative of the need for modifications to the incident light in two dimensions, one with respect to the x-axis and the other with respect to the y-axis. As one possibility, the incident beam 16 of FIG. 17 can be modified with respect to the y-axis in a manner similar to that accomplished by the lens 80 of FIGS. 12 and 13. Then, the incident beam 16 can be modified with respect to the x-axis in a manner shown in FIGS. 1, 2, and 4, to produce the light intensity profile 58 of FIG. 7. As another possibility, assume for example, that the resultant intensity distribution in both directions is to be the uniform intensity distribution 50, shown in FIGS. 6, 8, and 9, then the incident light can be modified in two dimensions by the techniques of FIGS. 1, 2, and 4, to create a substantially rectangular light profile 88, as illustrated in FIG. 18. For accomplishing light redirection in the above described ways, the lens 27, the reflector 12, and the lens 38 would have the redirecting surface 11 with an aspherical shape. For example, FIG. 19 illustrates such a variation for the lens 27. Moreover, the aperture 28 has a rectangular configuration. With respect to one of the axes, the "−b" to "b" range preferably remains constant. As explained, the incident beam 16 can be redistributed in the embodiment of FIG. 19 using the techniques of FIG. 2 to provide uniform light intensity in one dimension. Alternatively, the incident beam 16 can be rearranged in two dimensions by using conventional mathematical iterative procedures to redistribute the light with respect to both the x-axis and y-axis.

Referring to FIG. 20, two dimensional intensity uniformity can be accomplished by incorporating the light redirecting techniques of FIGS. 1, 2, and 4 to modify the radial planes 90 of the redirecting surface 11. As an illustrative example, the radial planes 90, passing through the optical axis 18, of the lens 27 are modified in each radial plane in a manner illustrated in FIG. 2. In this embodiment, the lens 27 has a radial symmetry with respect to the optical axis 18 with the aperture 28 having a circular configuration. This produces a resultant circular intensity profile (not shown) with substantially uniform intensity with respect to both the x-axis and the y-axis.

Referring to FIG. 20, the circular light profile of uniform intensity, produced by the radially symmetric lens 27, as with the other embodiments, can be further modified by interposing other optical components between the radially symmetric lens 27 and the output plane 14. For example, the radially symmetric lens 27, shown in FIG. 20, can be substituted for the modified cylindrical lens 27 in the two optical element arrangement of FIGS. 12 and 13. In such a case, the resultant light profile would have a narrow elliptical configuration with the light being uniform with respect to the x-axis. For the purposes of determining the scope of this invention, it should be appreciated that the output plane 14 is shown as passing through the flow stream 44, and may have many light redirecting elements interposed between the output plane 14 and the light source 10, as illustrated in FIGS. 12 and 13.

In summary, one dimension beam concentration of the incident beam 16, within a single plane, is illustrated in FIGS. 1, 2 and 4 using the redirecting surface 11, which can take different forms, such as the lens 27, the reflector 12 and the lens 38. As will be obvious to one skilled in the art, one dimension beam concentration can be incorporated into numerous three dimensional refractor and reflector arrangements, such as the preferred modified cylindrical redirecting surface arrangement of FIGS. 12 and 13. In this preferred arrangement, the modified cylindrical redirecting surface 11, as illustrated in FIG. 14, has the aperture 28 with a uniform width that preferably modifies the incident beam so that the resultant intensity profile is uniform with respect to one of the axes of the output plane 14. Other less desirable reflector and refractor arrangements can incorporate the beam concentrating modifications of FIGS. 1, 2, and 4, such as those illustrated in FIGS. 19 and 20. Moreover, a uniform intensity profile can be created at the output plane 14 in which there is two dimensional intensity uniformity with respect to both axes.

Although the illumination of particles is illustrated as one possible application where the above described redistribution techniques are particularly useful, other applications of these techniques will be obvious to those skilled in the art. Although the term "light" is used in the description of the preferred embodiments, the redirecting surface 11 can be used with other types of radiant energy, and is not necessarily restricted to visible wavelengths.

The mathematics involved in redirecting the light rays for the lenses 27 and 38 of the embodiments of the present inventions are described hereinafter. There are four basic cases:

(1) the symmetric lens 27 with cross over rays, as illustrated in the embodiment of FIG. 20,
(2) the asymmetric lens 27 with cross over rays, as illustrated in the embodiment of FIG. 14,
(3) the symmetric lens 38 without cross over rays, which is illustrated in radial cross section in FIG. 4, and
(4) the asymmetric lens 38 without cross over rays, as illustrated in the embodiment of FIG. 16.

In all four above described cases, we have the following introductory formalism. Let $R_1$ and $R_2$ be the radiant fluxes of the incident beam onto any one of the lenses 27 or 38 and the output plane 14, in units of watts, respectively. Let $M_1$ and $M_2$ be the radiant excitance distributions of the incident beam and output plane (corresponding to $R_1$ and $R_2$) in units of watts/meter$^2$. Let all the radiant energy falling on the lens by cylindrically symmetric about the optical axis 18. In the analysis below, the effects due to reflection off the lens material-surrounding material and due to absorption of light in the lens material will be ignored for the sake of clarity.

By conservation of energy, the following equation results:

$$R_1 = R_2 \tag{4}$$

and equivalently:

$$\int_{a_1} M_1(r) \cdot da = \int_{a_2} M_2(r) \cdot da \tag{5}$$

where $a_1$ and $a_2$ are the areas normal to the optical axis 18 of the incident radiant energy, having a radius "a"; and of the output plane 14, having a radius "b". The radial distance from the optical axis 18 is "r".

In cases 1 and 3 (the symmetric lenses 27 and 38 with and without cross over rays, respectively), let $M_1$ have a Gaussian profile. (This formalism can be used for other profiles as well.) Accordingly:

$$M_1(r) = M_0 \cdot \exp[-(r/r_a)^2] \tag{6}$$

where $M_0$ is the radiant excitance of $M_1$ at $r=0$ and $r_a$ is a constant with units of length. For a constant profile at the output plane 14 and equal to $M_2$ we can solve for $M_2$. Equation 5 becomes:

$$\int_0^{2\pi} M_0 \cdot \exp[-(r/r_a)^2] r \, dr \, d\phi = \int_0^a M_2 \cdot r \, dr \, d\phi \tag{7}$$

where $\phi$ is the azimuthal angle. Thus, the following equation results with $a >> r_a$:

$$M_2 = (r_a/b)^2 \tag{8}$$

Case 1 (symmetric lens 27 with cross over rays) will now be specifically considered.

The incident rays located at distances from the optical axis of $r'_j$, $j = 0, 1, \ldots, N$ are selected so that these rays are refracted to distances from the optical axis 18 in the output plane 14 of $r_j$, $j = 0, 1, \ldots, N$, respectively. Our convention will be that $r_0 = r'_0 = b$ and $r_N = 0$ and $r'_N = a >> r_a$. Let the $r'_j$ values be equally spaced, i.e., $$\Delta r'_j = r'_j - r'_{j-1}$$

AND $$\Delta r'_{j+1} = \Delta r'_j$$

The corresponding $r_j$ values are computed from adding the radiant fluxes between $r'_j$ and $r'_{j-1}$ and between $r_{j-1}$ and $r_j$ and dividing by the area in the output plane 14, $\pi(r_{j-1}^2 - r_j^2)$. The result is set equal to $M_2$ found in equation (8):

$$M_2 = \frac{\int_0^{2\pi} \int_{r_j}^{r_{j-1}} \exp(-r^2) \cdot r \, dr \, d\phi + \int_0^{2\pi} \int_{r'_j}^{r'_{j-1}} \exp(-r^2) \cdot r \, dr \, d\phi}{\pi(r_{j-1}^2 - r_j^2)} \tag{9}$$

$$M_2 = \frac{\exp(-r_j^2) - \exp(-r_{j-1}^2) + \exp(-r_{j-1}'^2) - \exp(-r_j'^2)}{r_{j-1}^2 - r_j^2}$$

Those $r_j$ values satisfying equation (9) are needed, starting with $r_0=b$. This can be done with standard root finding techniques in numerical analysis.

At the refracting surface, N parabolas are pieced together, such that they and their first derivatives are constant across the $r'_j$ values. The jth parabola is of the form $z_j = a_0 + a_1 r'_j + a_2 r'^2_j$. The distance parallel to the optical axis 18 from the vertex of the lens 27 (where the refracting surface crosses the optical axis 18) the refracting surface is z, $0 \leq z_j$, $j=0, 1, \ldots, N$. The slope is given by:

$$m_j = \frac{dz}{dr'}\bigg|r' = r'_j$$

All the $r'_j$ and $r_j$ values are known. For a given j in the iteration process, the next z and m values are needed. The coefficients describing the next parabola, ($a_0, a_1, a_2$) are needed:

$$z_{j-1} = a_0 + a_1 \cdot r'_{j-1} + a_2 \cdot r'^2_{j-1} \quad (10a)$$

$$z_j = a_0 + a_1 \cdot r'_j + a_2 \cdot r'^2_j \quad (10b)$$

$$m_{j-1} = a_1 + 2a_2 \cdot r'_{j-1} \quad (10c)$$

$$m_j = a_1 + 2a_2 \cdot r'_j \quad (10d)$$

Equation (10a) indicates that the jth parabola must go thru the point ($r'_{j-1}, z_{j-1}$). Equation (10b) indicates that the jth parabola goes thru ($r_j, z_j$). Equation (10c) indicates that the jth parabola has the same slope, $m_{j-1}$, at ($r'_{j-1}, z_{j-1}$) as does the j-1st parabola. Equation (10d) indicates that the jth parabola has the desired slope, $m_j$, at ($r'_j, z_j$).

There are four equations and five unknowns ($z_j, m_j, a_0, a_1, a_2$); therefore another relation is needed. This is obtained by considering the refraction of the incident ray, parallel to the optical axis 18, to be desired location in the output plane 14. Let $\theta_j$ be the jth angle of incidence at ($r'_j, z_j$).
Then:

$$\theta_j = \text{Arc tan}(-m_j), \theta_j > 0 \quad (11)$$

Let $\theta'_j$ be the jth angle of refraction at ($r'_j, z_j$), then by Snell's law, the following equation results:

$$\theta'_j = \text{Arc sin}(n \cdot \text{Sin } \theta_j), \theta'_j > 0 \quad (12)$$

The relative index of refraction of the lens 27 compared to the surrounding medium is n. Let $\theta_j$ be the positive angle between the light ray joining ($r'_j, z_j$) to its location on the output plane ($r_j, B$) and the optical axis 18. The distance between the vertex of the lens 27 and the output plane 18 is B. z is measured from the vertex and the positive direction is from the lens 27 to the output plane 18. Then:

$$\phi_j = \text{Arctan}\left(\frac{r'_j - r_j}{B - z_j}\right) \quad (13)$$

$$\phi_j = \theta'_j - \theta_j$$

Three more equations have been added (11-13) and two unknowns, $\theta_j$ and $\theta'_j$, B and n are given $r'_j$ and $r_j$ are predetermined. Equation (13) can be rearranged for better use:

$$z_j = B - \frac{r'_j - r_j}{\tan(\theta'_j - \theta_j)} \quad (14)$$

The following algorithm can be used:

1. Select a trial m between $m_{j-1} < m < m_{min}$, where $m_{min} = \tan \theta_c$ and where $\theta_c$ is the critical angle of incidence:

$$\theta_c = \text{Arc sin}(1/n)$$

Use equation (14) to compute $z_j$ for this trial m.

2. Use equations (10a) thru (10c) to compute the coefficients ($a_0, a_1, a_2$).

3. Compute $F = m_j - a_1 - 2a_2 r'_j$ from equation (10d). Go back to step 1 and find that m making F=0. Then $m = m_j$.

4. Compute a $z_j$ corresponding to $m_j$ using equation (14). Use equations (10a), (10b) and (10d) to compute the final ($a_0, a_1, a_2$).

Now Case 2 (asymmetric lens 27 with cross over rays) will be specifically considered. Using the x-y coordinate system in FIG. 7, in the output plane 14 the following relationship exists:

$$M_2 = M_0 \cdot C \cdot \exp[-(y/r_a)^2]$$

where c and $r_a$ are constants. No matter which path the particle takes within the stream 44 of FIG. 7, it is exposed to a radiant exitance distribution described by equation (15). Solve for c using equations (4), (5) and (15) to obtain the following equation:

$$M_2 = \frac{\sqrt{\pi} r_a}{2b} \cdot M_o \cdot \exp[-(y/r_a)^2] \quad (16)$$

Express $M_1(x,y)$ in an x-y coordinate system, using $r^2 = x^2 + y^2$ and equation (6):

$$M_1(x,y) = M_0 \cdot \exp[-(x/r_a)^2] \cdot \exp[-(y/r_a)^2] \quad (17)$$

Divide the x coordinates in a similar way to which the r values were divided, $x_j, x'_j, j=0, 1, \ldots N$. Compute the radiant exitance over an elemental displacement in the y dimension, $\Delta y$, setting the result in the output plane 14, equal to the incident radiant exitance.

$$\frac{\int_{-b}^{b} \int_{y-\Delta y/2}^{y+\Delta y/2} M_2 \cdot dy dx}{\Delta y} = \frac{\int_{x_j}^{x_{j-1}} \int_{y-\Delta y/2}^{y+\Delta y/2} M_1 \cdot dy dx + \int_{x'_{j-1}}^{x'_j} \int_{y-\Delta y/2}^{y+\Delta y/2} M_1 \cdot dy dx}{\Delta y \cdot (x_{j-1} - x_j)} \quad (18)$$

Use equation (16) and equation (17) in equation (18), to obtain the following equation:

$$l = \frac{erf(x_{j-1}/r_a) - erf(x_j/r_a) + erf(x_j'/r_a) - erf(x_{j-1}'/r_a)}{x_{j-1} - x_j} \quad (19)$$

where the error function is defined by:

$$erf(z) = \frac{2}{\sqrt{\pi}} \int_o^z \exp(-t^2) \cdot dt \quad (20)$$

The $x'_j$ are set to equal increments just as the "r"s were with $x'_0 = b$ and $x'_N = a >> r_a$. Using equation (19), all the $x_j$ values can be obtained and the surface of the lens can be generated using the formalism which led to equations (10) and (14).

Now turning specifically to Cases 3 and 4 (the symmetrical and the asymmetrical lens 38 without cross over rays), the output plane 14 is divided into equal segments for r and x, similar to $r'_j$ and $x'_j$ above. Use the formalism which led to equations (10) to (14) to define the surface of the lens.

Although particular embodiments of the invention have been shown and described here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. An illumination system for a particle analyzer of the type wherein particles are illuminated to produce detectable signals, said illumination system including a radiation source for providing incident radiation having a non-uniform intensity distribution and means for moving a stream of the particles through a predetermined region of an output plane, wherein the improvement in said illumination system comprises:

redirecting means having a central portion and a peripheral portion, each said portion being disposed and configured to receive part of the incident radiation;

said central portion being constructed to permit the incident radiation to irradiate the predetermined region of the output plane, the predetermined region having a size smaller than the cross-sectional size of the incident radiation;

said peripheral portion being constructed to redirect specific rays of the incident radiation to specific locations in the predetermined region of the output plane so that the specific locations are further irradiated to create, within the predetermined region, resultant radiation having a substantially uniform intensity distribution, whereby the particles are illuminated by the resultant radiation.

2. In the illumination system of claim 1,
   said redirecting means comprising a lens having a peripheral lens portion and an aperture formed within the lens;
   said peripheral portion of said redirecting means comprising said peripheral lens portion, said peripheral lens portion having a curved outer surface for redirecting the incident radiation;
   said central portion of said redirecting means comprising said aperture, whereby the incident radiation proceeds through said aperture without substantial optical modification.

3. In the illumination system of claim 1,
   said redirecting means comprising a lens having a peripheral lens portion and an integrally formed central lens portion;
   said peripheral portion of said redirecting means comprising said peripheral lens portion, said peripheral lens portion having a curved outer surface for redistributing the incident radiation;
   said central portion of said redirecting means comprising said central lens portion, said central lens portion having opposed planar surfaces, whereby the incident radiation proceeds through said central lens portion without substantial optical modification.

4. In the illumination system of claim 1,
   said redirecting means comprising a reflector having a central reflector portion and a peripheral reflector portion;
   said peripheral portion of said redirecting means comprising said peripheral reflector portion, said peripheral reflector portion having a concave configuration for redistributing the incident radiation;
   said central portion of said redirecting means comprising said central reflector portion, said central reflector portion having a planar configuration.

5. In the optical device of claim 1,
   the predetermined region of the output plane having a configuration with at least some smaller dimensions in a least one direction relative to the corresponding dimensions of the incident radiation;
   whereby the resultant radiation at the output plane has a smaller profile of higher intensity than the profile of the incident radiation.

6. In the illumination of claim 1,
   the predetermined region of the output plane having a configuration with at least some smaller dimensions in two perpendicular directions relative to the corresponding dimensions of the incident radiation;
   whereby the resultant radiation at the output plane has a smaller profile of higher intensity than the profile of the incident radiation.

7. In the illumination system of claim 1,
   the incident radiation comprising collimated radiation.

8. In the illumination of claim 1,
   the incident radiation comprising convergent radiation.

9. In the illumination system of claim 1,
   the incident radiation comprising divergent radiation.

10. In the illumination of claim 1,
    the incident radiation comprising peripherally disposed, incident radiation represented by a pair of opposed skirts of the non-uniform intensity distribution and centrally disposed radiation represented by the remaining center of the non-uniform intensity distribution;
    said redirecting means including means for relocating the peripherally disposed, incident radiation, to be disposed in overlapping relationship with centrally disposed radiation, so as to produce resultant radiation having a substantially narrower, flatter desired intensity distribution at the output plane.

11. In the illumination system of claim 1,
    said incident radiation having a Gaussian intensity distribution having a center area and a pair of opposed skirt areas, said skirt areas defined to have successive segments of radiation;

said central portion of said redirecting means configured and dimensioned so that the incident radiation, represented by the center area of the Gaussian distribution, passes therethrough to the predetermined region of the output plane, the predetermined region having successive positions defined therein;

said peripheral portion of said redirecting means configured and dimensioned to progressively shift the successive segments of radiation to the successive positions at the output plane, with the most remote segment of each skirt being shifted to the nearest available position with respect to the center of the incident radiation passing through said center portion of said redirecting means; whereby the skirts of the incident intensity distribution are folded over to create the desired intensity distribution with a narrower width and flatter profile.

12. In the illumination system of claim 1, said peripheral portion of said redirecting means having a modified cylindrical configuration;

a cylindrical lens positioned between said peripheral portion of said redirecting means and the output plane, said cylindrical lens orientated to line focus the radiation in a direction substantially perpendicular to direction in which the radiation is modified by said redirecting means.

13. In the illumination system of claim 1, said peripheral portion of said redirecting means having radial symmetry;

said central portion of said redirecting means having a circular outer boundary.

* * * * *